April 9, 1963    R. C. LASSIAT    3,084,451
SEPARATING GAS FROM GRANULAR SOLIDS
Filed April 27, 1961
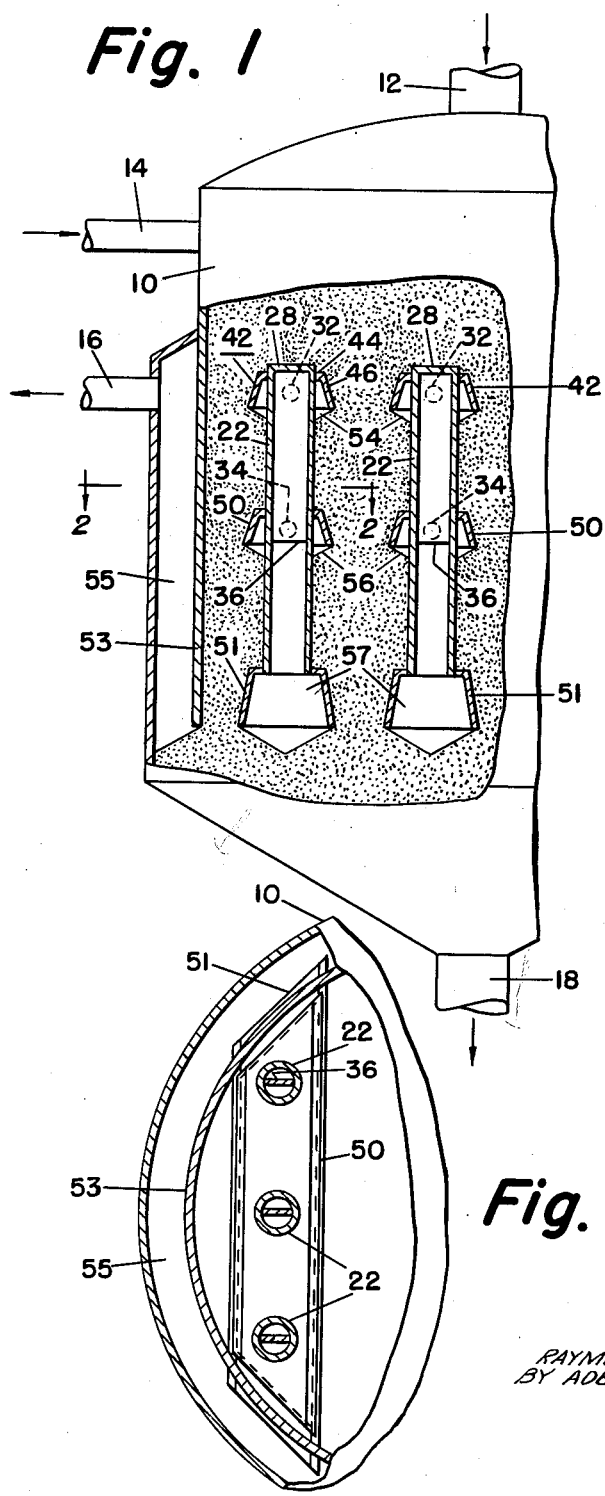
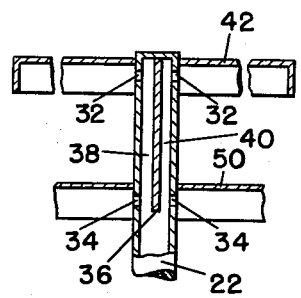
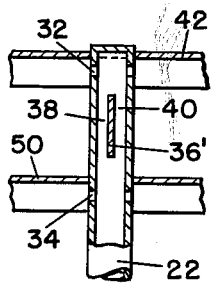
INVENTOR.
RAYMOND C. LASSIAT, DECEASED,
BY ADELE LASSIAT, ADMINISTRATRIX
BY
Robert O. Spindle
ATTORNEY United States Patent Office 3,084,451
Patented Apr. 9, 1963

3,084,451
SEPARATING GAS FROM GRANULAR SOLIDS
Raymond C. Lassiat, deceased, late of Swarthmore, Pa., by Adele Lassiat, administratrix, Swarthmore, Pa., assignor to Sun Oil Company, Philadelphia, Pa., a corporation of New Jersey
Filed Apr. 27, 1961, Ser. No. 107,001
2 Claims. (Cl. 34—170)

In various commercial processes, granular solid material is employed as a moving compact bed for the contacting of gaseous or vaporous materials in order to bring about some physical action or chemical reaction in the gaseous material. The gaseous material is then separated from the granular solid material, and various collecting systems have been used previously to accomplish the separation. The gas is thoroughly distributed within the compact bed, and suitable apparatus is provided for collecting the gas from the various parts of the bed.

In the catalytic conversion of hydrocarbons, e.g. catalytic cracking of higher boiling point petroleum hydrocarbons in order to form gasoline, one of the principal processes employed involves the use of a compact moving bed of granular catalyst, the petroleum reactants being introduced into the bed at one level and the reaction products being withdrawn from the bed at another level.

In order to separate the gas from the granular solids in such processes, a plurality of vertical gas-collecting pipes have been employed in the vessel, the pipes being distributed uniformly over the cross section of the vessel. Baffles associated with the gas collecting pipes are employed in order to cause the bed of solids surrounding the pipes to be deflected away from the pipes at a plurality of vertically spaced levels and to form, between the lower ends of the baffles and the pipes, upper bed surfaces at which gas disengages from the bed and enters a gas space between the baffle and the pipe. From this space, the gas passes through orifices or apertures in the side wall of the pipe, flows downwardly through the pipe into a gas chamber beneath the pipe, and leaves the vessel through a gas outlet communicating with the gas chamber.

It has been found in commercial practice that erosion of the inner surfaces of the side wall of the gas collecting pipes takes place. Frequently it is found that the erosion occurs in a surprisingly localized manner at a level slightly above the apertures in the pipe which are at the next to highest level at which apertures are provided. It has been found that the cause of this erosion is the formation of a gas vortex or eddy within the pipe by the gas passing downwardly from the level of the uppermost apertures in the pipe. The eddy consists of a rapidly rotating current of gas in a horizontal plane. The catalyst dust, which is carried in small amounts into the pipe by the gas, becomes concentrated in the eddy and exerts an abrasive action which cuts deeply into the pipe wall in a narrow band slightly above the next to highest apertures, and in time cuts completely through the wall at that location.

The present invention provides novel apparatus and process whereby the undesirable erosion characterizing the prior art operation is eliminated. The invention will be more fully described with reference to the attached drawing wherein FIGURES 1 and 2 are plan and elevation views respectively of one embodiment of the invention, FIGURE 3 is a partial elevation view at right angles to the elevation view of FIGURE 1, and FIGURE 4 is a partial elevation view of another embodiment of the invention.

Referring to FIGURES 1, 2 and 3, the numeral 10 represents a vessel for the contacting of granular solids as a moving compact bed, with a gaseous or vaporous material, e.g. petroleum hydrocarbons which are to be catalytically cracked by contact with the granular solid catalyst. The vessel has a solids inlet 12, a gas inlet 14, a gas outlet 16 and a solids outlet 18.

A plurality of gas collecting pipes 22 are positioned within the vessel. Each of the pipes 22 has a closed upper end 28, and also has two opposed apertures 32 at an upper level and two opposed apertures 34 at a lower level. Within each pipe 22 is a vertical plate 36 which extends downwardly from the top of the pipe and which extends laterally to divide an upper part of each pipe into parallel channels 38 and 40. Each of the channels communicates with one of the apertures 32 in the upper set and with one of the apertures 34 in the lower set. The lateral edges of the plate 36 may be against the inner wall of the pipe 22, as shown in FIGURE 1. Alternatively, a slight clearance may be provided, as illustrated later.

Baffles 42, in the form of inverted troughs, extend horizontally across the vessel near the level of the upper apertures 32 in pipes 22. The baffles have upper portions 44 which extend outwardly from the pipe and outer portions 46 which extend downwardly to a level beneath the upper apertures 32. Similar baffles 50 are provided in association with the lower set of apertures 34.

The pipes 22 communicate at their lower ends with baffles 51, in the form of inverted troughs, which extend through the wall 53 into the annulus 55 between wall 53 and the wall of vessel 10, and which form gas chambers 57 communicating with the lower ends of pipes 22.

In operation, the gas which disengages from the upper surfaces 54 and 56 of the compact beds surrounding the pipes, enters the pipes through the apertures at the respective levels and passes downwardly through the pipes. The gas which enters the upper apertures 32 passes downwardly as two parallel streams through the channels 38 and 40 respectively. The plate 36 in each pipe prevents the gas introduced through the apertures 32 from assuming a horizontal eddy flow pattern within the pipe. The gas therefore passes through the channels 38 and 40 as substantially non-vortical streams, and erosion of the wall by eddying solids is prevented. As the gas passes beneath the lower ends of plates 36, the streams are recombined, and the gas introduced through orifices 32 and 34 is passed downwardly through the lower part of pipes 22 into the gas chambers 57 beneath the channels 51. The gas passes through channels 51 into annulus 55 and is withdrawn through outlet 16.

A typical construction of a gas collecting pipe for use according to the invention involves the use of a two inch diameter pipe (inside diameter about 1.94 inches) which is about 30 inches high and has an upper set of apertures 1½ inches below the top of the pipe, and a lower set of apertures 16 inches below the top of the pipe. The upper apertures are $13/32$ inch in diameter, and the lower apertures $9/16$ inch in diameter. A plate ⅛ inch thick, 1.90 inches in width and 17 inches long is suspended from the top plate which closes off the top of the pipe.

In FIGURE 4, an alternative embodiment is illustrated wherein the upper and lower extent of the plate 36' is less than that of the plate 36 in the embodiment of FIGURES 1, 2 and 3, the functions of the plates nevertheless being substantially the same in the respective embodiments. Typically the plate 36' in FIGURE 4 is 6 inches long, with its top 1.5 inches below the centerline of the orifices 32.

The plates 36 or 36' has a substantial vertical extent within the space between the upper set of orifices and the next highest set of orifices. Any construction which is effective to direct the gas from the upper orifices into a vertical path, and thereby retard the formation of a horizontal eddy, is suitable. The suitable dimensions vary according to the dimensions of the other equipment and the operating conditions, but preferably the plate 36 or 36' has a vertical extent of at least 2 pipe diameters within the upper two-thirds of the distance between the upper orifices and the next highest orifices. Any desired greater height can be employed, and the plate can if desired extend through the entire height of the gas-collecting pipe.

As shown in the drawing, a single partition 36 or 36' is employed to divide the cross section of the gas-collecting pipe into two portions. Additional partitioning means can be used to divide the cross section into additional portions, e.g. equal thirds, equal quarters, etc.

In place of the trough-like baffles 42 and 50 as shown in the drawing, individual inverted cup-like baffles for each gas-collecting pipe can be employed, as well known in the art.

In place of the baffles 51 as shown in the drawing, other means, as well known in the art, can be employed for conveying the gas from the lower ends of the pipes 22 to the outlet 16. For example, the means employed in J. E. Evans Patent No. 2,661,322, issued December 1, 1953, for conveying gas from the lower ends of the gas-collecting pipes 4 to the outlet 2, can be employed.

In typical operation of the apparatus according to the invention, about 37% of the total gas flow into the pipe 22 is through the upper orifices 32 having $13/32$ inch diameter, the remaining 63% being through the lower orifices 34 having $9/16$ inch diameter. In operation according to the invention, at least 28% of the total gas flow passes through the upper orifices, since if the amount is below 28%, the undesirable horizontal eddy appears, even with the plate 36' present. With the plate absent, the eddy occurs whenever 42% or less of the total gas flow is through the upper orifices, so that in normal operation with 37% of the gas flow being through the upper orifices, the eddy is present, with detrimental results as noted previously.

The upper apertured area and the lower apertured area provided by the apertures 32 and 34 respectively, may each contain one or more individual apertures. Preferably, but not necessarily, the total aperture area at the upper level is less than, and more preferably within the range from 0.25 to 0.75 times, the total aperture area at the the lower level.

The invention claimed is:

1. Apparatus for separating gas from granular solids which comprises: a vessel; a plurality of gas-collecting pipes therewithin, each pipe having substantially circular cross section having a closed upper end and having an apertured area in an upper portion of the sidewall thereof; a substantially vertical plate in each of the gas-collecting pipes, extending downwardly in the region beneath the apertured area and extending laterally to divide the pipe into plural, parallel, substantially vertical channels, and means for conveying gas from the lower ends of said pipes to the exterior of said vessel, whereby gas disengages from a compact bed of solids surrounding each gas-collecting pipe, enters the apertures therein, passes downwardly through the respective channels as parallel, substantially non-vortical streams, and is removed from the vessel.

2. Apparatus according to claim 1 wherein a baffle is secured to each pipe at a level above the apertured area and extends outwardly from the pipe at that level and downwardly to a level beneath the apertured area, whereby gas disengages from the compact bed of solids at a bed surface between the pipe and the lower end of the baffle.

References Cited in the file of this patent

UNITED STATES PATENTS

| | | |
|---|---|---|
| 2,400,194 | Day | May 14, 1946 |
| 2,661,322 | Evans | Dec. 1, 1953 |
| 2,748,060 | Hicks | May 29, 1956 |
| 2,776,876 | Bowles | Jan. 8, 1957 |